United States Patent [19]

Yuzawa et al.

[11] Patent Number: 4,866,324

[45] Date of Patent: Sep. 12, 1989

[54] BRUSHLESS MOTOR

[75] Inventors: Suezo Yuzawa, Kanagawa; Masafumi Yamakawa, Tokyo; Takao Shibayama, Saitama, all of Japan

[73] Assignees: Canon Kabushiki Kaisha; Canon Seki Kabushiki Kaisha, both of Tokyo, Japan

[21] Appl. No.: 186,484

[22] Filed: Apr. 26, 1988

[30] Foreign Application Priority Data

Apr. 28, 1987 [JP] Japan .................................. 62-105990
Apr. 28, 1987 [JP] Japan .................................. 62-105991
Apr. 30, 1987 [JP] Japan .................................. 62-109409
Apr. 30, 1987 [JP] Japan .................................. 62-109410

[51] Int. Cl.$^4$ ............................................. H02K 1/04
[52] U.S. Cl. ..................................... 310/268; 310/43; 310/44

[58] Field of Search ................... 310/43, 44, 68 R, 89, 310/90, 156, 268

[56] References Cited

U.S. PATENT DOCUMENTS 4,719,377  1/1988  Horie et al. ......................... 310/44

FOREIGN PATENT DOCUMENTS

2952095  7/1980  Fed. Rep. of Germany ........ 310/43
0096169  5/1985  Japan ........................... 310/DIG. 6

Primary Examiner—Peter S. Wong
Assistant Examiner—Judson H. Jones
Attorney, Agent, or Firm—Fitzpatrick, Cella, Harper & Scinto

[57] ABSTRACT

The present invention relates to a brushless motor which utilizes part of the motor housing, which is formed by a plastic mixed with particles or fibers of a magnetic material, as a stator yoke.

6 Claims, 6 Drawing Sheets

BRUSHLESS MOTOR

BACKGROUND OF THE INVENTION

1. Field of the Invention

The present invention relates to a motor housing of a brushless motor, and more particularly to a brushless motor having a motor housing molded by plastics mixed with magnetic materials.

2. Description of the Related Art

In a brushless motor of face opposed flat type structure, small sized precision motors such as DC motors, Hall motors or seat coil motors are comparatively prevalent, and they are widely used as driving sources of the various electronic apparatuses.

In this motor of the face opposed flat type structure, it is required to decrease thickness of the motor to the extremity to get a thin type motor.

However, as for these types of brushless motors with face opposed flat type structure generally, a motor shaft is movably supported at the boss portion of the motor housing, and to the end of which (flange face) a stator yoke and an exciting coil are installed and a rotor yoke and a rotor magnet are installed on the rotor fixed to the motor shaft to obtain torque by the magnetic circuit formed through them.

By the way, it has conventionally been adopted a structure, wherein the aforementioned stator yoke is generally made with the parts of magnetic materials independently to fix to a motor housing which is molded by non-magnetic materials such as plastics or is a cutting product made of magnetic and non-magnetic materials.

However, in such a conventional brushless motor, some problems have been observed such that another stator yoke has been required, the number of the parts to be used has been increased, and the increase of the number of assembly has led to the increase of the assembly man-hour. Therefore, a brushless in a form of both a rotor and a stator serving as a housing has been disclosed as Japanese Laid-Open Patent Application No. Sho 60-174053.

But, in such a case, a stator yoke is formed by electric conductors such as iron to advantageously attain high magnetic flux density, but in some cases, increasing the rotation speed (exciting frequencies) causes eddy-current loss sharply.

SUMMARY OF THE INVENTION

The object of the present invention is to solve the shortcomings described above to offer a brushless motor which has been improved in the accuracy of the revolution with simplified structure and decrease of eddy-current loss by forming with plastics mixed with magnetic materials a motor housing serving also as a stator yoke.

Another object of the present invention is to offer a brushless motor which has been improved in accuracy of its revolution by removing non-uniformity of eddy-current loss through run-out of the motor shaft.

A still further object of the present invention is to form a projection for positioning winding coils and for treating the coil end in one unit.

Still another objects of the present invention will be made clear by the preferred embodiments described below.

DETAILED DESCRIPTION OF THE PREFERRED EMBODIMENTS

An embodiment of the invention will now be described with reference to the accompanying drawings.

Figure 1:
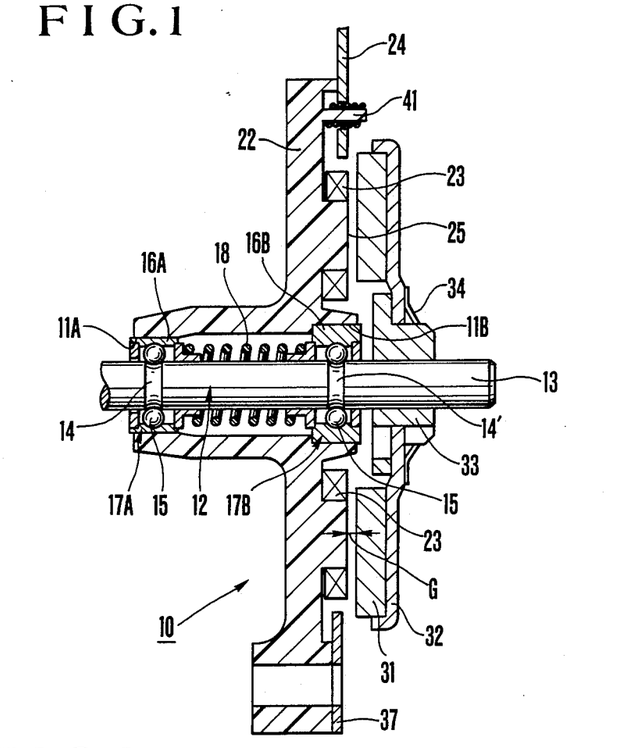
FIG. 1 is a longitudinal cross-sectional view concerning a brushless motor according to the embodiment of the present invention.
Figure 2:
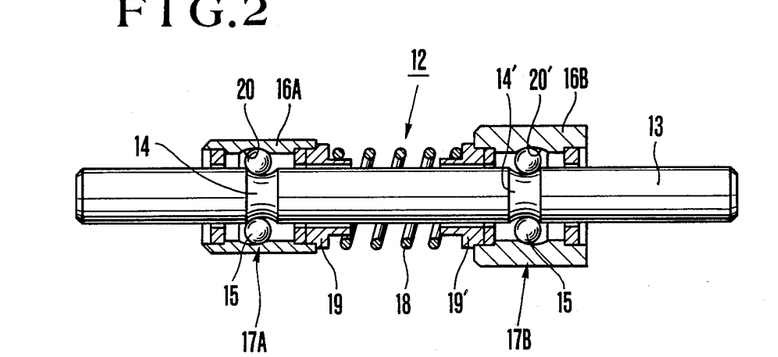
FIG. 2 is a longitudinal cross-sectional view of a bearing with shaft as shown in FIG. 1.

FIG. 1 is a longitudinal cross-sectional view of a brushless motor, and 10 is a motor housing. Bearing fittings 11A and 11B are formed on the boss portion of the housing 10. In an example of the drawing shown, a bearing-with-shaft 12 is attached to the bearing fittings 11A and 11B. The bearing-with-shaft 12 utilizes, as shown in FIG. 2, a shaft 13 itself as inner laces 14 and 14', and forms a pair of bearing sections 17A and 17B by inserting a plurality of balls 15 into two points on the shaft 13 in the circumferential direction and by fitting outer laces 16A and 16B on the outer circumference. At the same time, a pressure spring 18 is structured to include between the aforementioned outer laces 16A and 16B to exclude backlashes.

Inner laces 14 and 14' at the aforementioned positions are formed into a circumferential groove larger in circular arc cross-section than outer diameters of the balls 15 on the shaft 13. In the example shown, also, both ends of spring 18 push each of outer laces 16A and 16B in disaffected direction by way of slide pieces 19 and 19'. Lace grooves 20 and 20' in larger circular arc cross-section than outer diameters of the aforementioned balls 15 are formed in the inner surface of the outer laces 16A and 16B.

In the bearing-with-shaft 12 which has been explained in FIG. 2, the position of axial directions of the balls 15 and that of outer laces 16A and 16B in relation with each of inner laces 14 and 14' are determined in the fixed positions depending on the shape and dimensions of them. And the positions are maintained by pre-load of the spring 18, thus backlashes (gaps) between the shaft 13 and outer laces 16A and 16B are totally eliminated.

Again, in the bearing-with-shaft 12 of FIG. 1, the outer lace 16A on the smaller diameter side is shrink fit and the outer lace 16B on the larger diameter side is press fit to each predetermined positions. In this case, the larger diameter portion is press fit to determine the position while the shrink fit portion is not cooled down yet and loose, and then the smaller diameter portion is fixed through cooling down of the shrink fit portion.

Therefore, the bearing-with-shaft 12 is fixed with no backlash between the shaft 13 and the housing 10 even when integrated into the housing 10. It should be noted that both the outer laces 16A and 16B may be fixed by adhesion to the housing 10, or one of the outer laces 16A and 16B may be fixed by adhesion and the other may be fixed by shrink fit. On the opposite face of flange portion 22 of the housing 10 (the right side face of FIG. 1), a plurality of exciting magnetic coils 23 are circularly installed, and on the outer circumference of which is installed circuit board 24.

Each exciting coil 23 is lockably fixed to positioning projection 25 which is formed on the motor housing 10.

On the flange section 22 of the motor housing 10, pin projections 41 are formed into a plurality of positions to treat the coil end of each coil 23 described above.

Furthermore, the motor housing 10 is formed by an integral compact, wherein particles or fibers of magnetic materials such as iron and plastics are compounded to form mixtures of the coated magnetic materials and plastic materials for molding. As molding plastics for the motor housing 10, either thermo setting or thermo plastic materials such as PBT (Poly butyrene terephthalate), nylon or epoxy resin may be applied. The motor housing 10 which is molded in such a way has magnetism due to magnetic materials mingled therein to construct a magnetic circuit. Therefore, an area in proximity to the exciting coil 23 of the motor housing 10 can be utilized as back yoke (stator yoke). And magnetic flux density can be controlled by the quantity of the mixed magnetic materials.

On the other hand, as described above, magnetic materials within the motor housing 10 are compounded beforehand into insulating plastics to prevent the magnetic materials from being in continuity between them after molding. For example, the motor housing 10 has nonconducting characteristic in unit length.

Therefore, the motor housing 10 has characteristic of decreasing eddy-current loss by suppressing the rising of the eddy-current at high speed as well as functioning as a stator yoke which forms effective magnetic passages.

Figure 3:
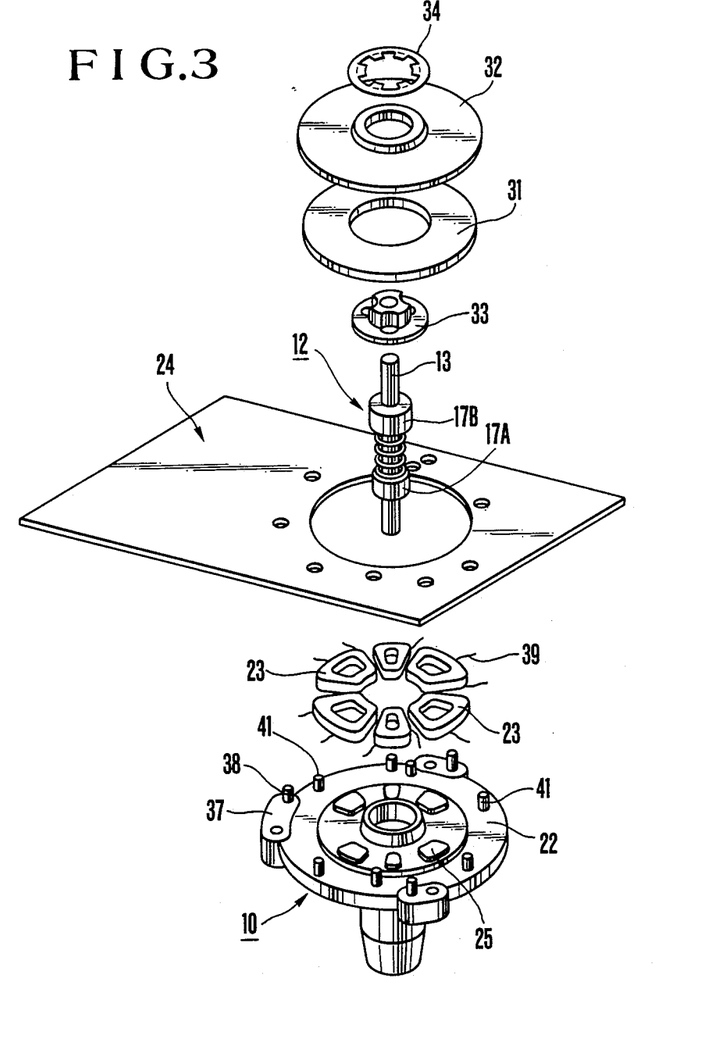
FIG. 3 is an exploded perspective side view of the motor as shown in FIG. 1.

As shown on FIG. 3, to the projection of the shaft 13, are attached a rotation section consisting of a rotor facing the exciting coils 23, that is, rotor magnet 31 and rotor yoke 32.

Thus, air gap can be formed between the projection 25 and the rotor magnet 31. As it is clear from the structure shown on the drawing, the air gap can be made in minimum dimensions without any restrictions on thickness of the circuit board.

In an example shown, flanged collar 33 is fixed by press fitting on the projection of the shaft 13. Rotor yoke 32 with rotor magnet 31 is attached to the collar 33 by locating snap ring 34. Predetermined numbers of N poles and S poles are alternatively formed in the rotor magnet 31 in the circumferential direction.

The magnetic circuit (magnetic flux passage) consists of a closed circuit which passes from N pole of the rotor magnet 31 to the exciting coil 23, to the stator yoke (motor housing 10), to predetermined off position from the angle of circumference after passing through the interior of the stator yoke, to the exciting coil 23, to S pole adjacent to the rotor magnet 31, to the rotor yoke 32, to the initial position of the angle of circumference after passing through the interior of the rotor yoke 32, and to N pole of the rotor magnet 31.

The brushless motor which has been described above utilizes the motor housing 10 itself as a stator yoke (back yoke) to decrease the number of the parts and to simplify the structure for attaining a decrease in the cost.

Magnetic efficiency in the magnetic circuit can be improved by adjusting mixing ratio of magnetic materials between 10–40 percent by weight.

Magnetic materials are compounded beforehand and mixed with plastics to prevent the magnetic materials from being in continuity between them after molding. And the motor housing 10 is kept in nonconductive conditions. By doing this, eddy-current loss can be decreased while maintaining magnetic flux density.

Figure 4:
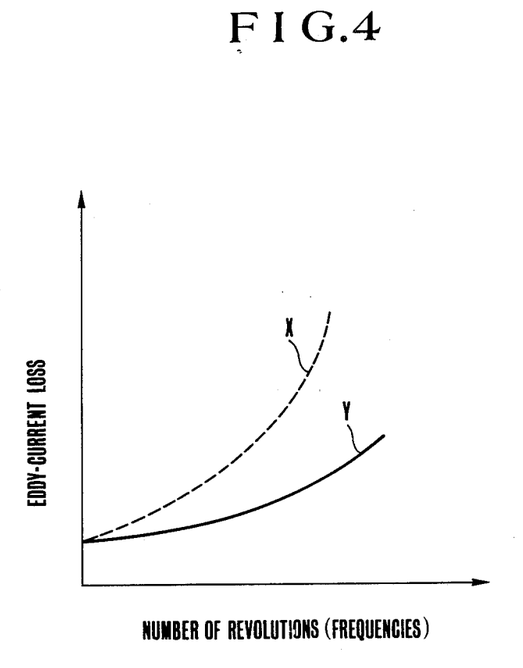
FIG. 4 is a characteristic diagram showing the relationship between the rotation speed and the eddy-current loss.

FIG. 4 shows the relationship between the revolutions of the motor and eddy-current loss for the conventional yoke (X) and the present invention (Y). As it is clear from FIG. 4, eddy-current loss at extremely high frequencies can be greatly decreased according to the present invention and it becomes possible to easily fabricate a high speed brushless motor. As has been explained above, the brushless motor has face opposed flat type structure and is preferably used as small sized precision motors, for example, a scanner motor or a spindle motor.

Figure 5:
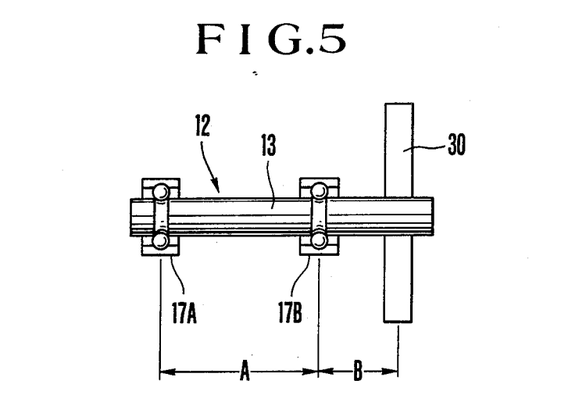
FIG. 5 is a schematically explaining drawing of the bearing of FIG. 1 which is equipped with a polygonal mirror.

FIG. 5 shows schematically the arrangement of each bearing sections 17A and 17B of the bearing-with-shaft 12 and the polygonal mirror 30 on the shaft 13 in the motor shown in FIG. 1.

In FIG. 5, supposing that clearance between bearing sections 17A and 17B as A, and between the bearing section 17B on the side of mirror 30 and the polygonal mirror 30 as B, then the arrangement is fixed in the range of $A/B \div 2 \pm 0.4$ in the motor according to the present invention.

Figure 6:
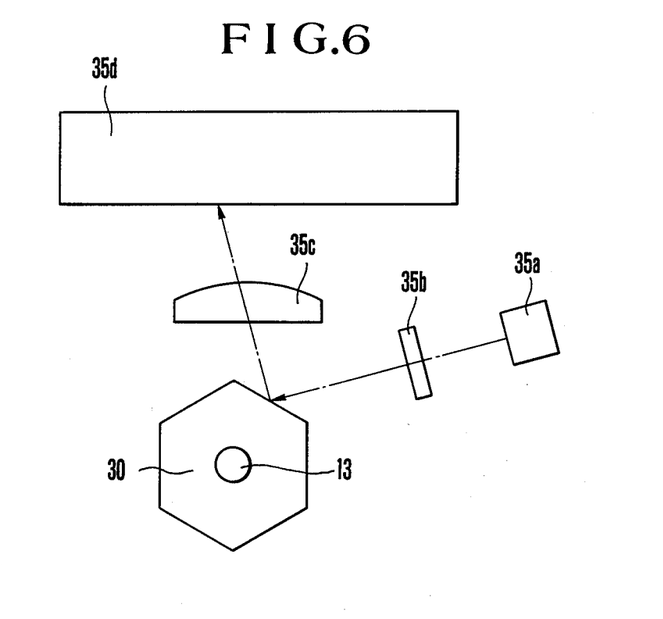
FIG. 6 is a schematically structural drawing of the motor equipped with a polygonal mirror of FIG. 1 showing an optical system which scans laser beams.

FIG. 6 shows an optical system scanning on photosensitive member by applying a scanner motor having a polygonal mirror. In FIG. 6, the beams emitted from a semiconductor laser unit 35a will be deflected by the polygonal mirror (revolving polygon mirror) 30 which is revolving at isometric speed by the scanner motor after passing through a beam shaping optical system 35b and being converted into parallel lights to be scanned linearly at constant velocity on the sensitive member of the drum 35d by passing through a compensating optical system 35c.

The optical system in FIG. 6 shows schematical structure of the optical writing system used for a laser printer and others. According to the scanner motor which has been explained above, the bearing-with-shaft 12 is utilized as a bearing structure of the motor shaft 13, to which (the same as the motor shaft) is directly attached the polygonal mirror 30. Therefore, the bearing-with-shaft 12 without any backlashes between the shaft 13 and the outer laces 16A and 16B is attached to the housing 10 by press fit and shrink fit in the similar way to prevent backlashes.

Thus, deflection or slanting of the motor shaft 13 can be eliminated and deflection or slanting at rotation of the polygonal mirror 30 which is fixed on the shaft 13 can also be eliminated.

Then, deflection or slanting of scanning light can be eliminated for clearly recording images or characters when used in a laser printer to improve balanced quality of printing.

Because of no backlashes, that is, deflection or slanting between the shaft 13 and the housing 10, clearance (bearing clearance) A between the two bearing sections 17A and 17B (FIG. 5) can be set to a minimum value and the scanner motor can be made in small size and light weight. For example, when the bearing clearance is supposed to be as A and the clearance between the polygonal mirror 30 and the bearing 17B on the near side of the mirror as B, it is difficult to set the value of A/B below 3 for conventional ball bearings because there is clearance between the shaft and bearings. In the structure of the present invention, the bearing-with-shaft 12 which has no backlash is used. Therefore, when the value A/B is lowered to approximately 2, there will be no deflection or slanting and it is possible for a compact scanner motor to execute precise optical scanning. Conventional controlling of the clearance between the shaft 13 and bearings 17A and 17B is not required totally, and higher accuracy than that in the past can be maintained even when the bearing clearance is shortened. Now, terminal treatment for the exciting coil 23 will be explained.

Figure 7:
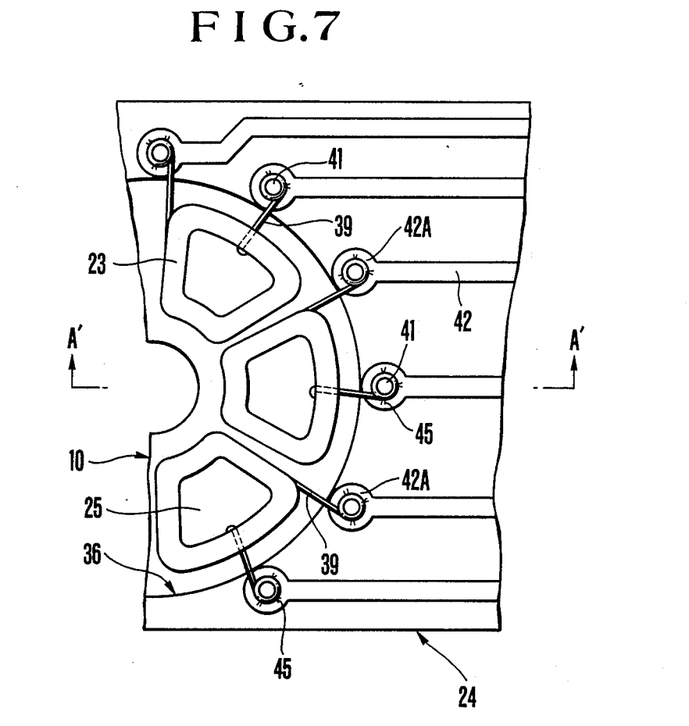
FIG. 7 is a plan view showing an example of the coil and terminal of the motor of FIG. 1.

On the circuit board 24, shown in FIG. 1, a circular opening 36 which is larger than the outer circumference of each coil 23 is formed, as shown in FIG. 7. Peripheral portions of the opening 36 are fixed to the housing 10 which is used as attaching members of coils by connecting to a fitting seat 37 on the outer circumference of the flange 22 with bolts. In an example shown, the circuit board 24 and knock pins 38 for positioning are planted on each fitting seat 37. As is shown in FIG. 3, also, coil terminals 39 of predetermined length, that is, the beginning and finishing portions of coil winding are extended from each coil 23.

Figure 8:
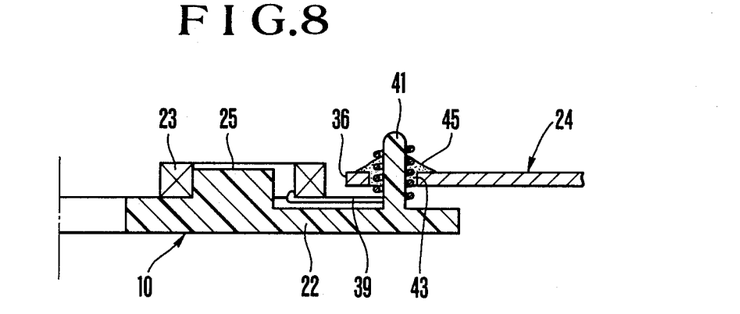
FIG. 8 is a sectional view taken on line A'—A' of FIG. 7.

However, according to the structure of the embodiment of the present invention, on the outer circumference of the flange 22 of the housing 10 as a coil attaching member, a plurality of projections 41 are formed in conformity with each coil terminal 39 of each coil 23, an each coil terminal 39 is wound to the corresponding projection 41. On the circuit board 24, lands 42A of the circuit pattern 42 which are connected to coil terminals of each coil 23 which is described above are formed and in the center of each land is formed a hole 43 (FIG. 8).

Moreover, each coil terminal 39 which is described above is in corresponding relations with the aforementioned each land 42A, and each projection (pin) 41, to which coil terminal 39 is wound, is formed in a position corresponding with each land 42A.

Moreover, each hole 43 has a diameter which allows the projection 41, to which coil terminal 39 is wound, to pierce, and that, the coil terminal 39 on each projection 41 is wound at the height exposing above the surface (the upper face) of the circuit board 24 after passing through the hole 43 when the circuit board 24 is fixed on the housing 10. Accordingly, the circuit board 24 is attached to the housing 10, in such a way that the hole 43 which is formed at the position corresponding to the connecting section of each coil terminal 39 engages each projection 41, and coil terminal 39 wound round each projection 41 is protruded over the circuit board 24 (pattern forming surface). and is assembled, in such a condition, by connecting each coil terminal 39 to corresponding land 42A, that is, the predetermined circuit pattern 42 on the circuit board 24 by solder 45.

Electric connection between the coil terminal 39 and the pattern 42 can be made in a suitable method such as solder 45 or laser welding.

When the circuit board 24 is to be fixed to the housing 10 described above, it can be performed through automatic process by positioning each hole 43 and each projection 41 to match and by putting the circuit board 24 over them.

According to the structure of the embodiment described above, as the structure of coil terminal treatment of a motor, it is possible to treat the coil terminal with the process that the terminal 39 of each coil 23 is wound to the projection 41 of the housing 10, and the circuit board 24, which is made positioning to each projection 41, is set over the housing 10, where the coil terminal 39 on the projection 41 which is protruded in a predetermined position on the circuit board 24 is connected electrically by solder or laser welding. In this way, it is not required to treat coil terminal whose positioning is not fixed as observed in a conventional method, and both winding and electric connections of the coil terminal 39 can be made at a fixed position, thus enabling these treatment processes to make totally automatic, and man-hour to decrease sharply.

Coils 23 are, also fixed to flange 22 which constitutes a stator yoke, and kept away from the circuit board 24. Then, clearance between rotor magnet 31 and stator yoke (projection 25), that is, air gap G (FIG. 1) is made narrower and efficiency of the motor is improved.

Furthermore, coil terminal 39 is wound to the projection 41 which engages the hole 43 of the circuit board 24. Therefore, it is easy to attach the coil terminal 39 to the projection 41 and is possible to exactly perform the connection between the coil 23 and the pattern 42 of the circuit board 24. In the embodiment described above, the coil terminal 39 is wound to the projection 41, holding the terminal temporarily, but any suitable methods may be applied if the coil terminal 39 is held temporarily.

Figure 9:
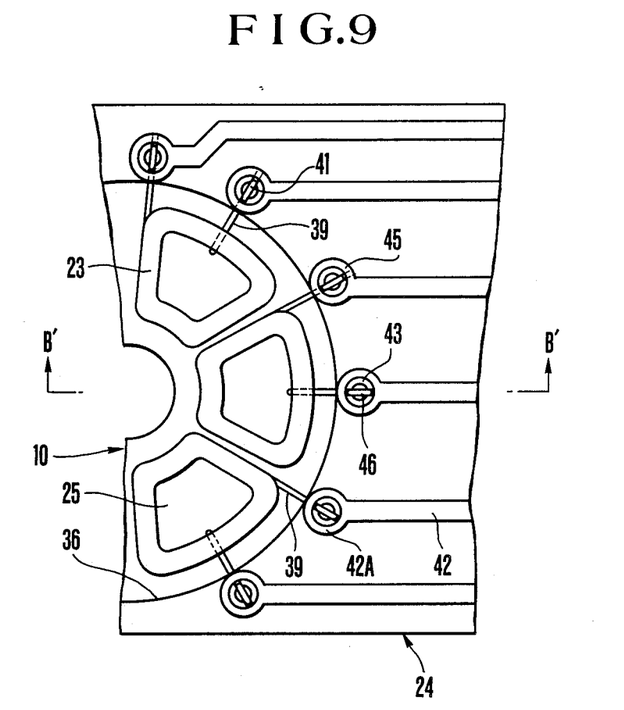
FIG. 9 is a plan view of the coil end terminal of the motor of FIG. 1 in further embodiment.
Figure 10:
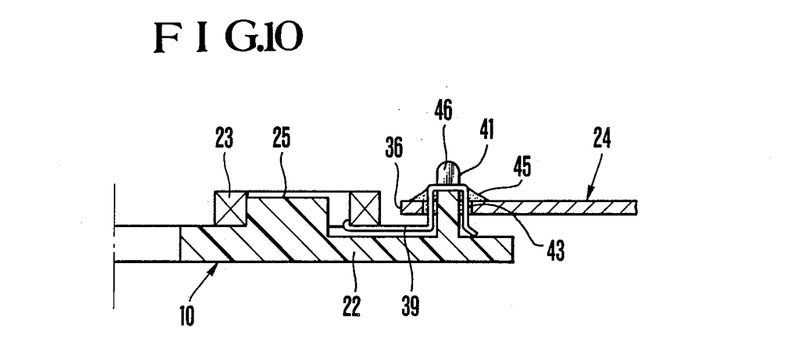
FIG. 10 is a plan view taken on line B'—B' of FIG. 9.

As in the cases of FIG. 9 and FIG. 10, for example, as a structure of coil terminal treatment of the motor, the coil terminal 39 can be treated in such a way that the terminal 39 of each coil 23 is inserted into the slit 46 and the circuit board 24 is set over the housing 10, while the circuit board 24 is made positioning to each projection 41. Then, the coil terminal 39 on the projection 41 extruded in the predetermined position on the circuit board 24 is electrically connected by soldering or laser welding.

As described above, the slit 46 is formed on each projection 41 to insert the corresponding coil terminal 39 of each coil 23.

For example, when the coil diameter is 0.2 mm, the width of the slit 46 can be determined as approximately 0.3-0.6 mm. As is made clear from the above explanation, according to the present invention, particles or fibers of magnetic materials are mixed with plastics, with which to form a motor housing, and part of which is used as a stator yoke to constitute a brushless motor. Therefore, the reduction in the cost is attained by decreasing the number of parts and by simplifying the structure. At the same time, a brushless motor which is easy to reach at high speed can be attained by decreasing eddy-current loss.

Projection is formed on coil fitting members and the coil terminal is attached to the projection. Then, a hole which is formed in a corresponding position with the coil terminal connection of the circuit board engages the projection. The circuit board is fitted in such a condition that the coil terminal is protruded over the circuit board to connect electrically the coil terminal to a predetermined pattern on the circuit board. Accordingly, it is possible to easily automate the connecting process of the coil terminal and moreover, to improve efficiency of the motor by making narrow the air gap. When used in a scanner motor of flat type structure, wherein a polygonal mirror which scans optical beams is attached to a shaft, a bearing-with-shaft is used as the bearing, and to which a polygonal mirror is fixed, and there will be no backlash between the shaft and the bearing. Then a bearing structure without deflection or slanting of the polygonal mirror can be obtained. Thus, it is possible to minimize a bearing span and to get a small sized and light weighted scanner motor. Moreover, it is also possible to make uniform a clearance between a rotor magnet and a stator yoke to prevent uneven eddy-current loss from arising in every portion on the stator side, thus improving the accuracy of the revolution of the motor.

What is claimed is:

1. A brushless motor comprising:
   a housing made of a magnetic material and an insulating plastic being compounded for forming and being mixed up to form a magnetic passage as well as to have nonconductive property after forming, said housing including a bearing engaging portion and a flange as a stator yoke;
   a plurality of exciting coils arranged circumferentially round said flange;
   a motor rotating shaft;
   a bearing installed at said bearing engaging portion, said bearing composing a bearing-with-shaft together with said motor rotating shaft inserted into said bearing, said bearing-with-shaft having a small diameter bearing portion diameter and a large diameter bearing portion which have different outer diameters;
   a rotor attached to said motor rotating shaft, said rotor being installed opposite to said plurality of exciting coils; and
   a rotor magnet installed on said rotor, said rotor magnet having predetermined numbers of N poles and S poles formed in the circumferential direction to form a magnetic circuit together with said flange and said rotor.

2. A motor according to claim 1, wherein said plurality of exciting coils are air core coils, said air core coils being positioned at projections for positioning formed on said flange.

3. A motor according to claim 1, wherein projections for treating terminals of said plurality of exciting coils are formed on said flange.

4. A motor according to claim 3, further comprising:
   a circuit board having predetermined patterns electrically connected to the terminals of said plurality of exciting coils,
   said electric connections being performed by said circuit board having holes engaged with said projections attached with the terminals of said plurality of exciting coils.

5. A motor according to claim 3, wherein each of said plurality of projections has a slit for attaching a respective one of the terminals of said plurality of exciting coils.

6. A scanner motor for driving a polygonal mirror to scan optical beams, comprising:
   a housing made of a magnetic material and an insulating plastic being compounded for forming and being mixed up to form a magnetic passage as well as to have nonconductive property after forming, said housing including a bearing engaging portion and a flange as a stator yoke;
   a plurality of exciting coils arranged circumferentially round said flange;
   a motor rotating shaft to which the polygonal mirror is fixed;
   a bearing fitted at said bearing engaging portion, said bearing composing a bearing-with-shaft together with said motor rotating shaft inserted into said bearing, said bearing-with-shaft having two bearing portions and being set in the range of A/B as $2\pm0.4$ when a clearance between the two bearing portions is supposed to be as A and a clearance between the polygonal mirror and the bearing portion on the side of said mirror is supposed to be as B;
   a rotor attached to said motor rotating shaft, said rotor being installed opposite to said plurality of exciting coils; and
   a rotor magnet installed on said rotor, said rotor magnet having predetermined numbers of N poles and S poles formed in the circumferential direction to form a magnetic circuit together with said flange and said rotor.

* * * * *

UNITED STATES PATENT AND TRADEMARK OFFICE
CERTIFICATE OF CORRECTION

PATENT NO. : 4,866,324
DATED : September 12, 1989
INVENTOR(S) : SUEZO YUZAWA ET AL.

It is certified that error appears in the above-identified patent and that said Letters Patent is hereby corrected as shown below:

ON THE TITLE PAGE
AT [75] INVENTORS:

"Suezo Yuzawa, Kanagawa;" should read
--Suezo Yuzawa, Yokosuka;-- and
"Takao Shibayama, Saitama," should read
--Takao Shibayama, Asaka,--.

AT [73] ASSIGNEES:

"Canon Seki Kabushiki Kaisha," should read
--Canon Seiki Kabushiki Kaisha,---.

COLUMN 1

Line 13, "small sized" should read --small-sized--.
Line 28, "it" should read --there--.
Line 40, "brushless" should read --brushless motor--.

COLUMN 2

Line 43, "include" should read --be included--.
Lines 49-50, "disaffected" should read --a different--.

COLUMN 3

Line 26, "butyrene" should read --butylene--.

COLUMN 4

Line 24, "small sized" should read --small-sized--.
Line 35, "$A/B \div 2 \pm 0.4$" should read --$A/B \approx 2 \pm 0.4$--.

UNITED STATES PATENT AND TRADEMARK OFFICE
CERTIFICATE OF CORRECTION

PATENT NO. : 4,866,324
DATED : September 12, 1989
INVENTOR(S) : SUEZO YUZAWA ET AL.

Page 2 of 2

It is certified that error appears in the above-identified patent and that said Letters Patent is hereby corrected as shown below:

COLUMN 5

Line 37, "an" should read --and--.

COLUMN 7

Line 10, "small sized" should read --small-sized--.
Line 11, "light weighted" should read --light-weight--.

Signed and Sealed this

Sixteenth Day of April, 1991

Attest:

HARRY F. MANBECK, JR.

*Attesting Officer*     *Commissioner of Patents and Trademarks*